United States Patent Office 2,857,436
Patented Oct. 21, 1958

2,857,436

ALCOHOL DEODORIZATION BY CONTACT WITH SILICEOUS MATERIAL AND IRON

Richard Mackinder, Bebington, Ralph George Kenzie, Ellesmere Port, and Peter Tiso, Little Sutton, England, assignors to Shell Development Company, New York, N. Y., a corporation of Delaware No Drawing. Application February 25, 1957
Serial No. 641,873

Claims priority, application Great Britain July 30, 1953

8 Claims. (Cl. 260—643)

This invention relates to an improved process for effecting the removal of malodorous impurities from lower aliphatic alcohols or aqueous solutions thereof.

The commercial utility of many lower aliphatic alcohols normally depends upon the odor thereof, alcohols with unpleasant odors being unacceptable. The odor specifications for various purposes are often quite rigorous—for example, the so-called "essence grade" alcohols must contain substantially no malodorous components.

Alcohols, or aqueous solutions thereof, which have been prepared by the catalytic hydration of lower olefins normally contain traces of various materials which impart an unpleasant odor to the alcohol. For example, isopropyl alcohol prepared by the sulfuric acid treatment of propylene-propane mixtures obtained in petroleum refining operations normally contains traces of such sulfur-containing compounds as hydrogen sulfide, carbonyl sulfide, methyl and ethyl mercaptans and the like, together with traces of compounds usually denoted by the general terms "polymers" or "high-boiling materials." Frequently these malodorous impurities are of such kinds and are present in such amounts that their complete removal requires extensive treatment of the alcohol, as by distillation or adsorption, which substantially increases the cost of the finished alcohol product. Further, in the case of alcohol-water mixtures (such as the constant-boiling mixture of isopropyl alcohol (87%) and water, which finds wide application in the lacquer industry) it is extremely difficult on a practical economic basis to remove the malodorous impurities to the extent that the desired odor specifications are met.

It is the primary objective of this invention to provide a simple, economic process for removing the malodorous contaminants from lower aliphatic alcohols or aqueous solutions thereof to such degree and extent that the most rigorous odor specifications are met, said process being eminently suited for commercial scale operation.

These objectives are met by the new process, which, generally described, comprises intimately contacting the alcohol or aqueous solution thereof with a finely divided siliceous material and, separately, metallic iron in a form which has a high surface area per unit weight.

The mechanism by which this treatment improves the odor of alcohols has not been determined, but it is believed that the treatment with the siliceous material involves adsorption of the contaminating materials, primarily those classed as "polymers," such as high-boiling hydrocarbons and high-boiling oxygen- or sulfur-containing hydrocarbon materials. The treatment with the metallic iron appears to involve primarily adsorption, and/or possibly reaction of the sulfur-containing compounds.

As the siliceous contact material, there may be employed any form of finely divided material which is predominantly siliceous in character. Exemplary of these contact agents are non-porous materials such as glass beads or helices, sand, finely broken glass or the like, and such porous materials as the various forms of diatomaceous earth, and unglazed porcelains. Preferred materials are diatomaceous earths (kieselguhr) and the commercially prepared special forms of calcined diatomaceous earth, such as those marketed under the trade name "Celite," and unglazed porcelains. A particularly desirable member of this class is the prepared material marketed under the trade name "Celite VIII." This material comprises diatomaceous earth bonded with clay or clay-like binder, pelleted into uniform cylindrical pellets about ⅜₂" long by ¼" diameter and calcined. It has the following approximate composition:

| | Percent by weight |
|---|---|
| Silica | 86.95 |
| Iron oxide | 2.17 |
| Alumina | 7.51 |
| Magnesia | 1.22 |
| Sodium oxide | 1.21 |
| Calcium oxide | 0.65 |
| Titanium dioxide | 0.19 |
| Remainder | 0.10 |

An outstanding group of siliceous materials for effecting deodorization of alcohols comprises the unglazed porcelains—that is, porous fired ceramic materials composed primarily of kaolin, typical of which is the unglazed porcelain material known as Majolica, available commercially in the form of small pieces of irregular shape. These materials, alone, have been found to effect a very substantial improvement in the odor of alcohols or solutions thereof—to the extent that alcohols or their solutions treated with Majolica, for example, comply with all but the most rigorous odor specifications. Thus, for many purposes alcohols having satisfactory odor characteristics can be obtained from malodorous alcohols by merely contacting the alcohol or an aqueous solution thereof with an unglazed porcelain material. (In such cases, additional treatment with metallic iron is unnecessary, and would result in additional unnecessary expense.)

Other siliceous materials, such as sand, do not have this marked effect on the malodorous materials in crude alcohols. When an alcohol or an aqueous solution of an alcohol is intimately contacted with sand, for example, some improvement in the odor of the alcohol or solution is obtained, but the amount of improvement is much smaller than that obtainable when the alcohol or solution is intimately contacted with, for example, Majolica. Therefore, the unglazed porcelains are not considered to be entirely equivalent to other siliceous materials, such as sand, for effecting deodorization of alcohols or aqueous solutions of alcohols: treatment of the alcohol or solution with any siliceous material (including both sand and unglazed porcelains) preceded or followed by treatment of the alcohol or solution with metallic iron results in a product which will pass the most rigorous odor specifications; only unglazed porcelains of all of the siliceous materials, approaches this combination treatment in effectiveness of odor removal.

This utility for unglazed porcelains is quite unexpected for the art has not generally considered such coarsely porous materials as the unglazed porcelains as effective agents for the removal of malodorous impurities from alcohols or their aqueous solutions.

As the metallic iron there may be used any metallic material which contains a major amount—i. e., greater than 50% by weight—of metallic iron. The iron must be in a form having a high surface area to weight ratio—i. e., the iron may be in the form of filaments, powder, filings, ribbons, or other shapes having a large area per unit weight. Especially suitable are those iron-containing materials available commercially as "steel wool," "iron gauze," or "soft iron filings." Steel wool is preferred since a bed of this material provides a high surface area together with a minimum pressure drop, thus requiring a minimum of work to effect contact between the alcohol and the iron metal. The treatment of the alcohol with the iron metal may either precede or follow treatment of the alcohol with siliceous material.

It has been found that no improvement in odor results when an alcohol or aqueous solution thereof is treated with other common metals, including copper, nickel, zinc and the like.

Treatment of the alcohol is effected by contacting the liquid alcohol or aqueous solution thereof with the solid contact material. Any method known to the art for intimately contacting a liquid with a solid may be employed. For example, the alcohol may be percolated through a bed of the active material or the active material and the alcohol may be mixed by vigorous agitation and separated by settling or decantation and/or filtration. It is preferred to percolate the alcohol downward by gravity flow through a bed of the active material. The term "active material" includes both the siliceous material and the metallic iron.

The degree of odor improvement is to some extent dependent upon the length of contact time between the active material and the alcohol, longer contact time, within limits, resulting in greater removal of the contaminating materials. In general, the alcohol flow rate should lie within the range of from about 0.1 to about 10 volumes of alcohol or solution thereof per volume of active material per hour (v. a./v. a. m./hr.), and it is preferred that the flow rate lie within the range of from about 0.5 to about 5 v. a./v. a. m./hr. If desired, odor removal may be effected with the aid of several beds in a series or by recycling the alcohol through a single bed of each of the active material.

It has been found that the degree of odor improvement tends to vary inversely with the temperature. For example, a much greater improvement in odor was obtained by contacting isopropyl alcohol with Majolica at 0° C. than was obtained by conducting contact at 50° C. Therefore, it is preferred to conduct the contact between the alcohol and the siliceous material at temperatures not substantially above ordinary room temperature—i. e., below about 50° C.—and it is preferred to conduct the treatment at temperatures of from about 0° C. to about 35° C. The treatment with the metallic iron may be conducted at any temperature at which the alcohol or its solution is a liquid. It is preferred that the treatment be carried out at the same temperature as that employed in contacting the alcohol or solution thereof with the siliceous material.

This process is effective in removing malodorous contaminating materials from lower aliphatic alcohols or aqueous solutions thereof, which have been prepared by the catalytic hydration of the corresponding mono-olefins. By the term "lower aliphatic alcohol" is meant those aliphatic alcohols containing not more than about 10 carbon atoms. Of this class the process herein described is most effective improving the odors of the lower alkyl secondary alcohols containing less than six carbon atoms. It has been found that the process herein described has its greatest effectiveness and hence is of primary value in effecting odor improvement of the above-defined alcohols which have been prepared by the catalytic hydration of mono-olefins—as by the sulfuric acid hydration process. For example, of this class of alcohols are isopropyl alcohol, sec-butyl alcohol, and sec-amyl alcohol.

It has been found that the active materials and especially the siliceous contact materials tend to become saturated with the malodorous impurities so that periodic replacement or regeneration of the active material is necessary. In the case of Majolica, the generation can be effected in situ by treatment with aqueous alkaline permanganate or dichromate, thus avoiding the time required in emptying and recharging the reactor. Celite may to some extent be regenerated by this same method, but economically, it will often be found more desirable that the bed of spent Celite be replaced with fresh material.

In addition to the above-described combination of treatments, it may be advantageous in some cases to additionally treat the alcohol with air. An aeration treatment is conveniently carried out by gently bubbling a dry, dust-free air into the liquid alcohol contained in a storage tank, the air entering through a spider located at the base of the tank.

Where the amount of impurities is low, or comprises primarily compounds containing little or no sulfur, treatment with the siliceous material alone may be sufficient to enable the alcohol to meet the less rigorous odor specifications. Normally, treatment with the siliceous material alone will not be sufficient to enable the alcohol to meet "essence grade" specifications. As pointed out hereinbefore, however, when an unglazed porcelain material is used as the siliceous contact material, the final product closely approaches "essence grade" odor specifications, and in fact will meet all but the most rigorous odor specifications. Similarly, treatment with the metallic iron alone is insufficient to produce an essence grade alcohol. By combining the two treatments, there are obtained results superior to the results that can be obtained with either active agent employed without the other, even with repeated contact with the alcohol.

The following examples illustrate, but do not limit the invention:

*Example I*

Twenty tons of malodorous isopropyl alcohol was passed successively through a bed of Celite VIII having a total volume of about 2.5 cubic feet and a bed of steel wool having a volume of about 2.5 cubic feet. The flow rate of the alcohol to both of the beds was about 7.2 cubic feet per hour. It was found that the odor of the alcohol was substantially improved, and that upon aeration, the product was "essence grade" in all respects.

*Example II*

Thirty-seven tons of malodorous isopropyl alcohol was passed successively through a bed of steel wool and a bed of Majolica chips. The flow rate of the alcohol was approximately one volume per volume of active material per hour. The product was "essence grade" in all respects.

*Example III*

Twenty tons of malodorous isopropyl alcohol was percolated successively through two beds of Celite VIII having a total volume of about 4.5 cubic feet. The alcohol flow rate was about 7.2 cubic feet per hour. Although a substantial improvement in odor was obtained after several passes through the two beds, the product did not fully comply with the specifications for "essence grade" alcohol.

*Example IV*

The process of Example III was repeated, substituting for the beds of Celite VIII, beds of steel wool. The results were quite similar—an ancohol of improved odor, not quite of "essence grade," was obtained.

*Example V*

Malodorous isopropyl alcohol was passed through successively two beds of Majolica chips, the rate of flow being about one volume of alcohol per volume of Majolica chips per hour. The final product had a very good odor, approaching closely the specifications for "essence grade" isopropyl alcohol.

*Example VI*

Malodorous isopropyl alcohol (the same as that used in Example V) was passed through a bed of fine grained beach sand, the rate of flow being about one volume of alcohol per volume of sand per hour. Improvement in odor of the alcohol was obtained. However, the amount of improvement was substantially less than that obtained in the treatment described in Example V. The same result is obtained using coarse sand such as is commonly used in water filtration.

*Example VII*

Treatment of the product alcohol of Example VI with steel wool (one volume of alcohol per volume of steel wool per hour) results in an "essence grade" product.

*Example VIII*

The experiment described in Example IV was repeated thrice, using copper turnings as the contact material in one of the replications, zinc turnings in another and granulated zinc in the third. No improvement in alcohol odor was noted in any of the three replications.

This application is a continuation-in-part of applicants' prior application Serial No. 445,944, filed July 26, 1954, and now abandoned.

We claim as our invention:

1. A process for improving the odor characteristics of a lower aliphatic alcohol which is prepared by the catalytic hydration of an olefin, which process comprises intimately contacting only the liquid malodorous alcohol with a finely divided siliceous material and an iron metal in a physical form having a high surface area to weight ratio.

2. A process for improving the odor characteristics of a lower aliphatic alcohol which is prepared by the catalytic hydration of an olefin, which process comprises intimately contacting only the liquid malodorous alcohol with an unglazed porcelain material and steel wool.

3. The process of claim 2 in which the alcohol is isopropanol.

4. A process for improving the odor characteristics of a lower aliphatic alcohol which is prepared by the catalytic hydration of an olefin, which process comprises intimately contacting only the liquid malodorous alcohol with a diatomaceous earth material and steel wool.

5. A process for improving the odor characteristics of a lower aliphatic alcohol which is prepared by the catalytic hydration of an olefin, which process comprises intimately contacting only the liquid malodorous alcohol with a finely divided siliceous material and an iron metal in a physical form having a high surface area to weight ratio at a temperature below about 50° C.

6. A process for improving the odor characteristics of a lower aliphatic alcohol which is prepared by the catalytic hydration of a mono-olefin, which process comprises intimately contacting only the liquid malodorous alcohol with only an unglazed porcelain material.

7. The process of claim 6 in which the alcohol is isopropanol.

8. A process for improving the odor characteristics of a lower aliphatic alcohol which is prepared by the catalytic hydration of a mono-olefin, which process comprises intimately contacting only the liquid malodorous alcohol with only an unglazed porcelain material at a temperature below about 50° C.

References Cited in the file of this patent

UNITED STATES PATENTS

| | | |
|---|---|---|
| 1,604,235 | Odom | Oct. 26, 1926 |
| 2,663,426 | Wilson et al. | Dec. 22, 1953 |
| 2,663,745 | Wilson | Dec. 22, 1953 |

OTHER REFERENCES

Neish: Canadian J. Chemistry, vol. 29 (1951), pp. 552–7.